(12) United States Patent
Penas Ballester et al.

(10) Patent No.: US 8,197,684 B2
(45) Date of Patent: Jun. 12, 2012

(54) DESALINATION DEVICE USING SELECTIVE MEMBRANES AND MAGNETIC FIELDS

(76) Inventors: Pedro Penas Ballester, Murcia (ES); Francisco Javier Abad Garrido, Murcia (ES)

( * ) Notice: Subject to any disclaimer, the term of this patent is extended or adjusted under 35 U.S.C. 154(b) by 0 days.

(21) Appl. No.: 13/060,715

(22) PCT Filed: Aug. 18, 2009

(86) PCT No.: PCT/ES2009/000430
§ 371 (c)(1),
(2), (4) Date: Feb. 25, 2011

(87) PCT Pub. No.: WO2010/023335
PCT Pub. Date: Mar. 4, 2010

(65) Prior Publication Data
US 2011/0147295 A1    Jun. 23, 2011

(30) Foreign Application Priority Data

Aug. 25, 2008   (ES) .................................. 200802513
Jul. 15, 2009   (ES) .................................. 200901589

(51) Int. Cl.
*C02F 1/48*   (2006.01)
*B01D 61/14*  (2006.01)
*B03C 1/30*   (2006.01)

(52) U.S. Cl. ........ 210/223; 210/222; 210/243; 210/295; 210/321.6; 210/321.87; 210/433.1; 210/695; 210/748.01; 204/664; 204/665

(58) Field of Classification Search ............. 210/222, 210/223, 243, 295, 321.6, 321.87, 433.1, 210/695, 748.01; 204/664, 665
See application file for complete search history.

(56) References Cited

U.S. PATENT DOCUMENTS

| 5,364,536 A * | 11/1994 | Mercier .................. 210/222 |
| 2004/0262234 A1 | 12/2004 | Warren .................. 210/695 |

FOREIGN PATENT DOCUMENTS

| ES | 1066215 U * | 1/2008 |
| ES | 1066217 U * | 1/2008 |
| WO | WO 2010023335 A1 * | 3/2010 |

OTHER PUBLICATIONS

Translation of the International Prelimnary Report on Patentabiltiy for PCT/ES2009/000430, Nov. 2010.*

* cited by examiner

*Primary Examiner* — David A Reifsnyder
(74) *Attorney, Agent, or Firm* — Sanchelima & Associates, P.A.

(57) ABSTRACT

Device designed to desalinate brackish water which performs said function by the combined action of magnetic fields generated inside the device and ion-selective membranes, thus obtaining two separate water currents, one with a low salt concentration and the other reject current with a high salt concentration. It comprises an external cylindrical body of magnetized iron (1), an inner body also cylindrical and made of the same material (2) and an intermediate chamber (3) in which are placed a series of ion-selective membranes (6 and 7) arranged radially around the axle common to all of the bodies, and placed alternately such that each negative-ion selective membrane has a positive-ion selective membrane on either side.

4 Claims, 4 Drawing Sheets

DESALINATION DEVICE USING SELECTIVE MEMBRANES AND MAGNETIC FIELDS

BACKGROUND OF THE INVENTION

1. Field of the Invention

The device provides a satisfactory solution for the physical separation of ions dissolved in an aqueous solution from the water molecules of said solution. It has been designed, basically, for the desalination of seawater.

2. Description of the Related Art

The background on selective-membrane desalination devices refers to machines or units that separate the ions dissolved in an aqueous solution using an electrical potential between two electrodes connected to an external power source, i.e. based on electrodialysis. Our desalinisation device does not include electrodes for generating said potential. Thus, it is not based on current concepts of saltwater electrodialysis.

U.S. patent publication No. 2004/0262234 discloses an apparatus and method for the purification of fluids and Applicants believe it is the nearest reference to our selective-membrane and magnetic-field desalinisation invention that does not use electrodes. It uses a rotating magnetic field and ion-selective-membrane batteries; however, there is still at least one channel that is rich in anions and another channel that is rich in cations, which generate an electrical potential. This does not occur in the present invention that is being claimed.

Applicants are aware of the existence of the Spanish utility models published under numbers 1066215 (ion-selective-membrane and magnetic-field desalination device according to electrical charge) and 1067217 (desalination device by rotation of a magnetic field and selective membranes according to their electrical charge). Both documents describe devices that desalinate part of a seawater flow based on the layout of a magnetic field, obtaining separate product and reject water currents in different channels; however, in both cases, the proposed objective was achieved by means of a channel structure in which one channel was filled only with positive ions and another channel was filled only with negative ions (the end channels), whereas the central channels remain neutral owing to the fact that they were filled or drained with the same number of positive and negative ions. The end channel that is filled with positive ions created a positive potential. The other channel, at the other end, which is filled only with negative ions, creates a negative potential. Accordingly, the difference in potential creates an electrical field that has a negative effect on the objective being sought, since the electrical forces that are created oppose the forces of the magnetic field, inhibiting the movement of the ions and, therefore, hindering their stratification into channels of dilute and concentrate As a result, a pair of electrodes connected together by an external conducting wire is necessary to close the electrical circuit. When said circuit is closed, the potentials cause the appearance of a movement of electrons. In turn, these electrons cause redox reactions at the ends. The result of these redox reactions is that the end channels are neutralised and the electrical potential at the ends disappears (to a large extent, there is always a remaining charge that causes the movement of electrons).

The special configuration of the device that is being advocated, which has no end channels that generate potentials, eliminates the electrical forces that counter the Lorentz forces created on the ions by the magnetic field, so that the movement of ions can continue without the need for the electrodes and with the advantage of avoiding the appearance of redox reactions. Furthermore, the energy that was used in the devices described in the utility models to create an electrical potential that generated electron movement, thus minimising the electrical field, is no longer necessary since said energy was used to neutralise the potential at the ends, but not in the useful movement of the ions. This represents a significant reduction of device-operation costs and a considerable improvement in performance.

Applicants are not aware of any similar device for carrying out the aforementioned water desalinisation work, which makes the novelty of this invention evident as it will provide a good number of benefits for the saltwater desalination industry and for the use of said water.

The present application also discloses improvements for increasing water production levels, energy performance levels and the effectiveness of the device, whereby they focus on the following specific issues:

On the one hand, the inclusion of the option for making the parts of the device in prismatic geometries instead of cylindrical geometries as mentioned in the main patent.

On the other, the determination of the required separation between the membranes inside the chamber to obtain the highest possible level of performance of the device.

Finally, it includes the option of achieving the magnetic field that is necessary to generate the movement of ions through the layout of superconductor coils through which an electrical current will flow.

The device bases its operation on the absence of end chambers. Accordingly, all the channels are maintained electrically neutral, thus avoiding the generation of potentials that have a negative effect on the desalination process. This configuration suggested a cylindrical model with all the bodies mounted on a common axle. The substitution of the original cylindrical geometry by prismatic geometry brings new options for the operation of the device, also enabling the manufacture of these elements.

In addition, the separation between membranes is a very important parameter when determining the energy performance levels of the system and the Donnan potential is a factor of great relevance. In one single channel, the ion concentration will not be consistent, since, owing to the attraction of the free ions in the selective membranes, there are higher levels of concentration in the nearby areas.

The highest concentration of ions in the areas near these membranes will therefore generate a small electrical potential (Donnan potential) that will hinder the movement of the ions caused by the magnetic field. As this circumstance cannot be eliminated, setting an appropriate distance between membranes of each type is of paramount importance to minimise the aforementioned negative effects.

Obtaining a magnetic field with sufficient intensity for the correct desalination of the water that is to be processed is difficult with permanent magnets, owing to the complex task of magnetising a hollow cylinder by placing one pole on the external face and another on the internal face. By positioning rolled coils on the external face of the external cylinder and the internal cylinder, a magnetic dipole can be obtained in whose magnetic field the direction of the field lines will be radial between both cylinders. Furthermore, this layout makes it possible to regulate the intensity of said field by controlling the current in the coils. This gives clear benefits in terms of manufacturing costs and the effectiveness of the device.

Other documents describing the closest subject matter provide for a number of more or less complicated features that fail to solve the problem in an efficient and economical way. None of these patents suggest the novel features of the present invention.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
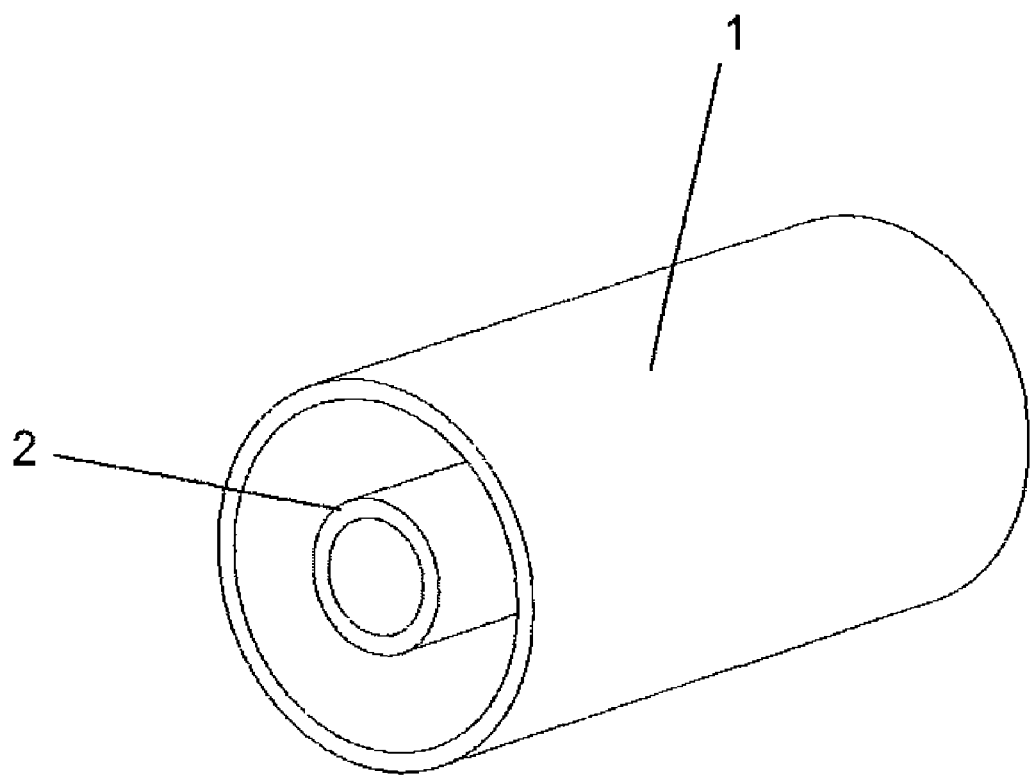
FIG. 1 shows the geometrical shape of the magnetic poles and their relative positions inside the device
Figure 2:
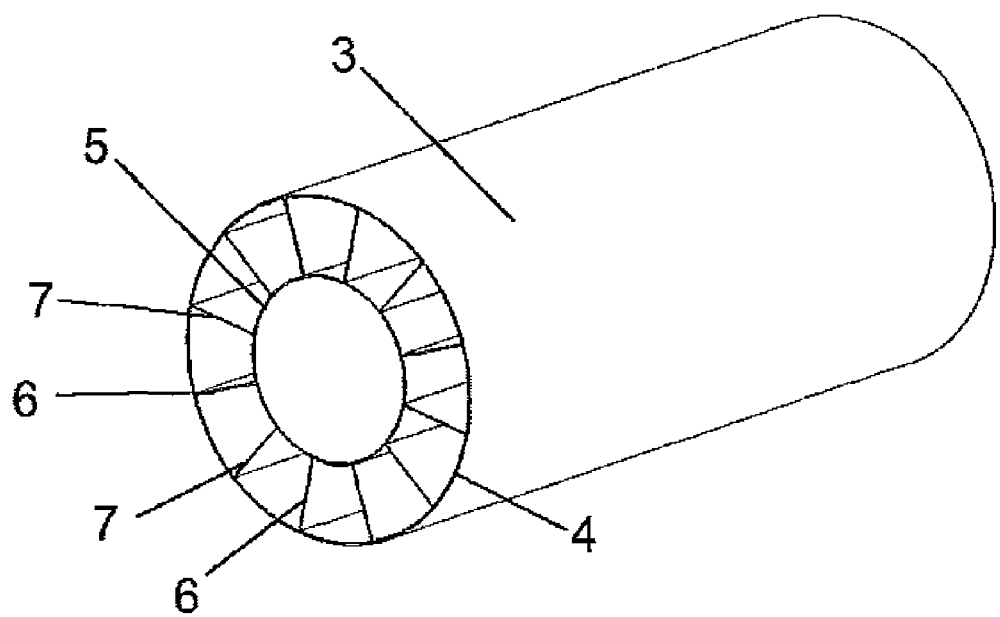
FIG. 2 shows the membrane chamber with the positions of the membranes in relation to the walls of the tube is such a way that they make up the channels through which the water that is to be desalinated and the currents of dilute and concentrate that are obtained will flow.
Figure 3:
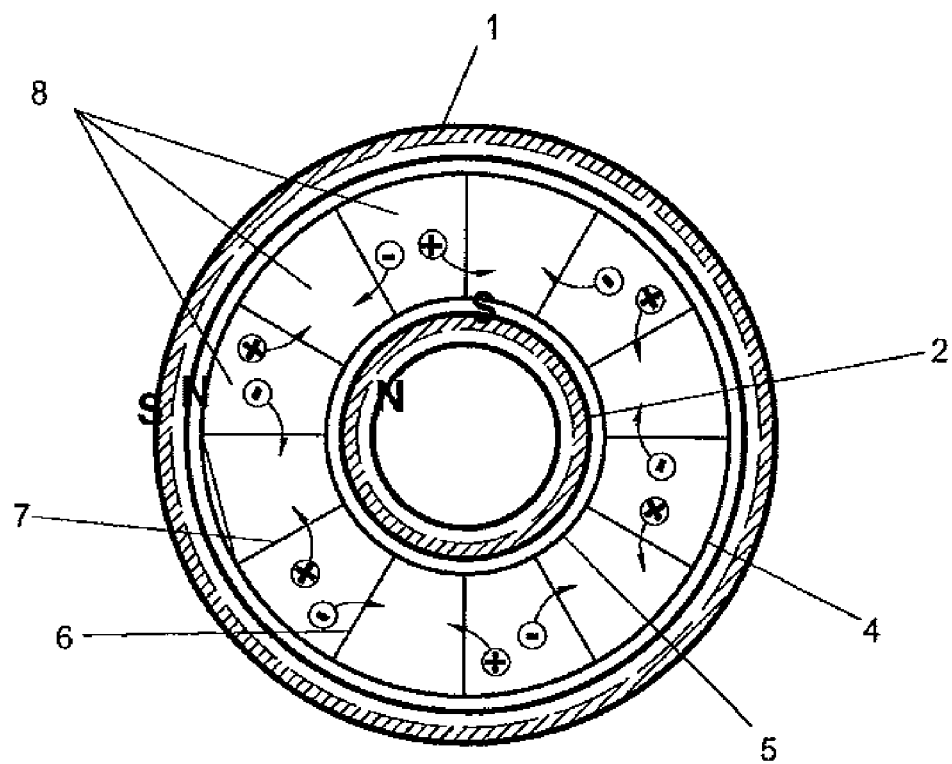
FIG. 3 shows the front aspect of the device with its components mounted, together with the movement of the ions when they are affected by the magnetic field that is produced, crossing the selective membranes to create channels of dilute and concentrate. The drawing also shows the magnetic poles of each of the external and internal cylinders, indicated with the letters N for North and S for South.
Figure 4:
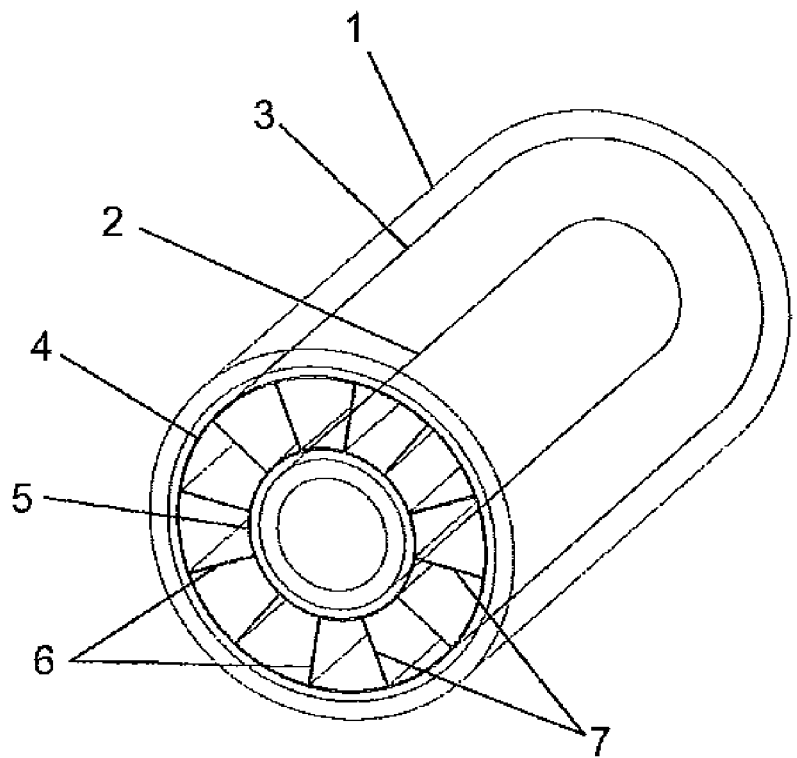
FIG. 4 gives a perspective view of the device after it has been mounted.
Figure 5:
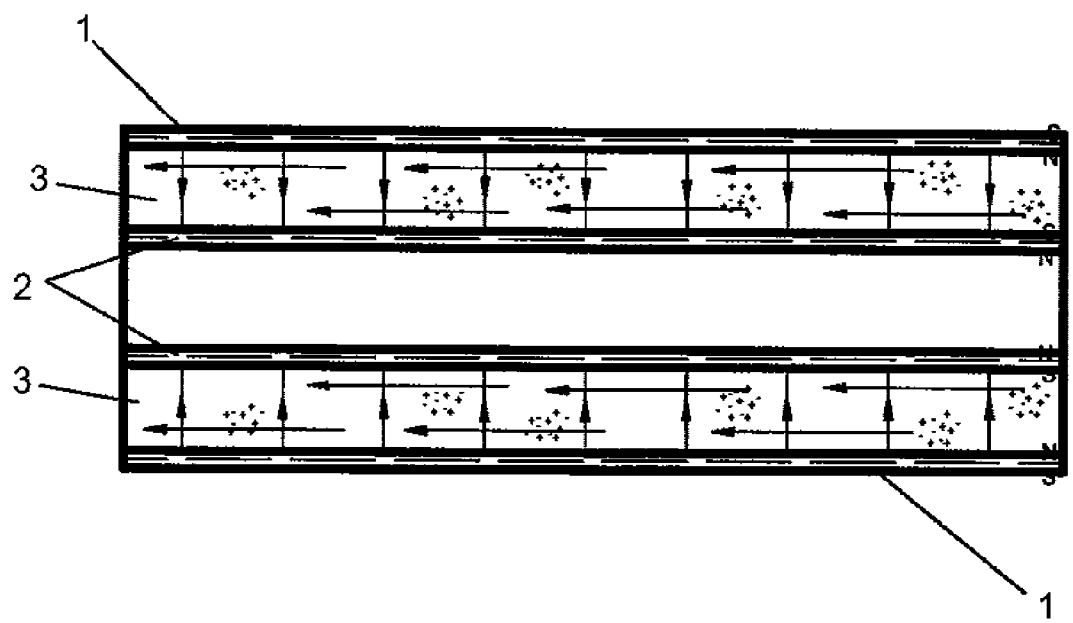
FIG. 5 shows the longitudinal section of the device, with the magnetic field generated inside the device represented with plot lines and dots and the direction of the water flow with arrows. When these effects are combined, they produce the movement on the ions shown in the previous figure.
Figure 6:
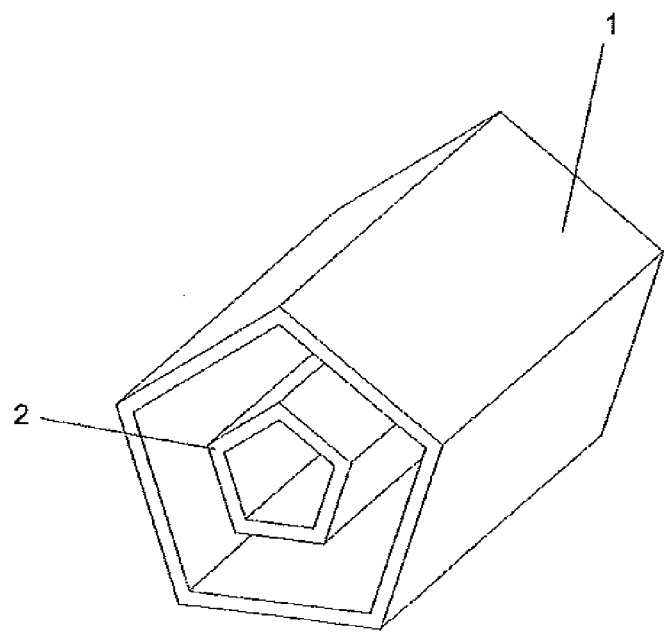
FIG. 6 shows another way of obtaining the device through the use of prismatic elements; in particular, it shows a geometry based on pentagonal prisms.
Figure 7:
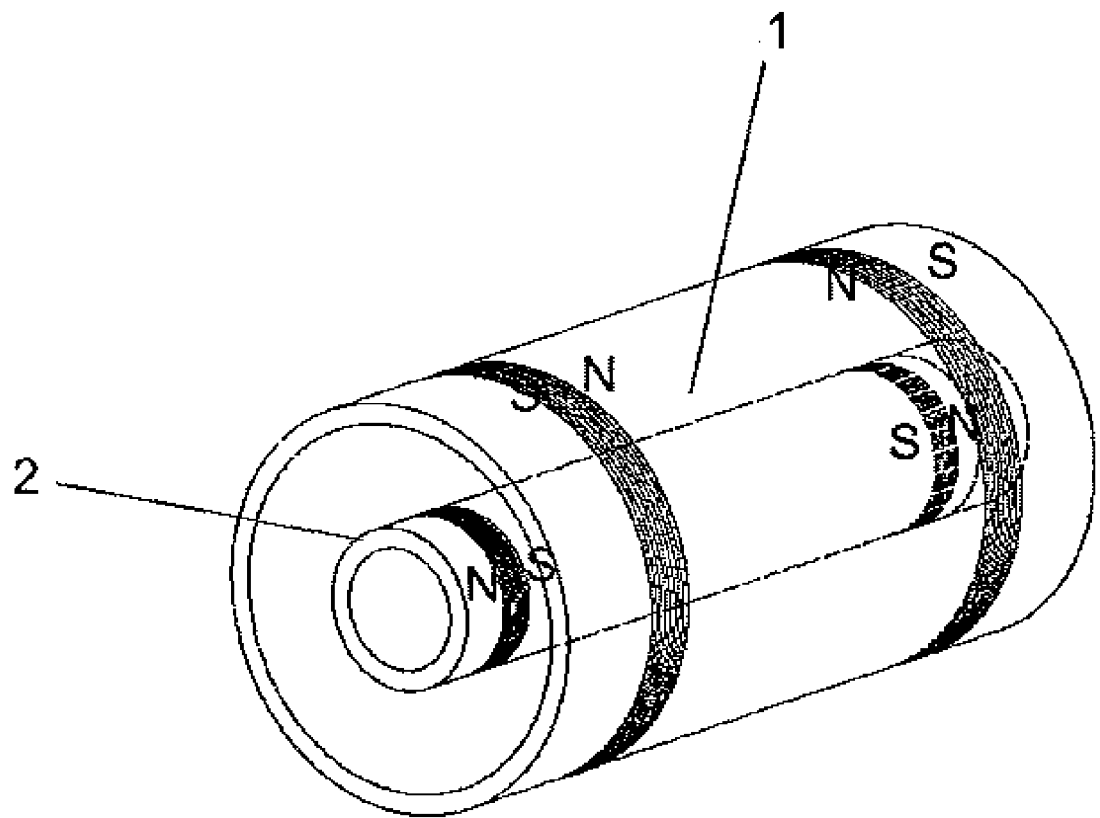
FIG. 7 shows a layout of rolled coils in the external and internal cylinders through which a magnetic field is obtained with radial field lines between both cylinders.

Device that is capable of desalinating part of the salt water flow that enters into it. Therefore, the water that enters into this device is converted into two different effluents. One effluent with a very low concentration of salt that is lower than the intake flow and another with a concentration of salt that is higher than that of the intake flow.

The device is configured on the basis of three fundamental parts, which comprise an external magnet (preferably a magnetized hollow tubular member of a given diameter), an internal magnet (preferably a magnetized hollow tubular member with smaller diameter than said external magnet) and an intermediate body between said magnets through which the water flow that is to be desalinated passes and which will be affected by the magnetic field generated by the magnets. These three elements will be mounted coaxially. This configuration suggests an optimal form of manufacture based on cylindrical bodies, although the device can also be made with any kind of prismatic geometry.

The magnets used for this device may be permanent magnets or superconductors rolled in coils around the external magnet.

The intermediate element between both magnets will have a hollow section and its interior will have a certain number of membranes positioned radially, alternating a positive-ion-selective membrane with other negative-ion-selective membranes in such a way that one membrane of one type will always be surrounded by two membranes of the other type. Similarly, each channel of this intermediate body will have a positive-ion-selective membrane on one side and another negative-ion-selective membrane on the other. This special geometry achieves the non-existence of end channels in which the electrical potentials that have a negative effect on the process are generated.

This device is based on the Lorentz forces that are generated when a conductor fluid crosses a magnetic field at a certain speed. Said forces produce a displacement of the ions in the fluid. The selective membranes create channels of diluted fluid (product) and channels of concentrated fluid (reject).

The desalination device based on selective membranes and magnetic fields that does not use electrodes uses a special geometry in both the positioning of the magnetic poles and that of the ion-selective membranes, depending on their charge, in such a way that the use of electrodes is not necessary.

Owing to the fact that the Lorentz forces act in a certain direction depending on the charge of the ion on which they act, the ions will be forced to pass through the selective membranes, and alternate channels of dilute from which the negative ions have departed through one membrane and the positive ions through the opposite membrane will be created, together with channels of concentrate, where positive ions have entered through one membrane and negative ions have entered through the other. Since all these channels will have the same number of positive and negative ions leaving or entering, they will be maintained electrically neutral to avoid the formation of electrical potentials that would have a negative effect on the operation of the device.

The development of this geometry and layout modifies the operative electrochemistry of typical desalination processes using electrodialysis devices. The new operative chemistry uses energy consumption that is very similar to the minimum consumption required from the thermodynamic point of view.

The geometry used in this new device means that the electrical charges in the channels of dilute and concentrate are always balanced and no electrical potentials are created between the cells. Therefore, there are no reduction or oxidation reactions or electrical current flows.

The selective-membrane and magnetic-field desalination device that does not use electrodes can be built in accordance with the following method.

The magnetic fields can be generated by permanent magnets or superconductor magnets. For this form of construction, reference is made to permanent magnets.

The cylinder with the largest cylindrical diameter (1) is made of magnetised iron in such a way that the internal cylindrical area contains the North Pole and the external diameter area contains the South Pole. In one of the embodiments, the external diameter of this tube, which is made of magnetised iron, measures one hundred centimeters and the internal diameter measures ninety centimeters.

The cylinder with the smallest external diameter (2) is made of magnetised iron in such a way that the internal diameter area contains the North Pole and the external diameter area contains the South Pole. The external diameter of this tube measures forty centimeters and the internal diameter measures thirty centimeters.

The external diameter of the intermediate tube (3) measures eighty-five centimeters and the internal diameter measures forty-five centimeters. The section between the internal and external diameters is not consistent and solid, but is rather as follows.

The section is hollow and the wall of the external diameter has a thickness of five millimeters, as does the wall of the internal diameter. Both walls are made of high-density polyethylene.

The external wall (4) and the internal wall (5) are joined together by membranes laid out radially in such a way that each membrane (6 and 7) runs from the wall of the internal diameter to the external diameter. The membranes are positioned in such a way that positive-ion-selective membranes (6) are alternated with negative-ion-selective-membranes (7) and positioned in parallel to the axle of the tube, which means that the spaces between each membrane, called channels (8), are circular sectors. The salt water is to flow through the interior of these channels (8). The channels of dilute alternate with the channels of concentrate in the same way that the negative-ion-selective membranes (7) alternate with the positive-ion-selective membranes (6).

The improvements made to this initial model include the option for making the components of the device with a prismatic geometry, which takes the specific form of triangular-based prisms, square-based prisms and, in short, any type of geometrical shape that is appropriate to the manufacturing process that is to be used.

The second improvement consists of setting an appropriate distance between the membranes to reduce the negative effect created by the Donnan potentials to a minimum. To do so, this effect must be counter-positioned against other hydraulic effects, such as the loss of charge generated by an excessive number of membranes and other parameters, including the final volume of each of the channels that are created. Thus, a separation between membranes of a range of between 0.2 cm and 2 cm makes it possible to obtain the optimal distance to obtain the highest possible level of performance of the device.

The third improvement is achieved by placing superconductor coils on the external face of the internal and external cylinders. These coils are laid out at a pre-set distance in accordance with the intensity of the current running through them, where said current has an alternate direction in each coil. Accordingly, the coils will be positioned in pairs, where the direction in which the current circulates in each coil alternates. This makes it possible to generate a number of north and south magnetic poles in the device, where the sum of all the magnetic fields that are generated leads to the resulting field lines in the intermediate area between both devices having a radial direction.

Having described the nature of this invention sufficiently, as well as the way in which it is to be put into practice, it is hereby recorded that, as an essential part of it, it may be put into practice in other ways that differ from the details given above by way of example, which will also obtain the protection that is being sought as long as the fundamental principle is not altered, changed or modified The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A desalination device using selective membranes and magnetic fields, comprising an external tubular magnet (1), an internal magnet (2) and an intermediate body (3) with ion-selective membranes (6 and 7) characterised by the fact that the external magnet (1), the internal magnet (2) and the intermediate body (3) are mounted coaxially, where the intermediate body (3) has a hollow section with ion-selective membranes (6 and 7) positioned in an alternating, radial direction in such a way that each positive-ion-selective membrane (6) will have negative-ion-selective membranes (7) on both sides of it and each negative-ion-selective membrane (7) will have positive-ion-selective membranes on both sides (6) of it.

2. The desalination device using selective membranes and magnetic fields, according to claim 1, characterised by the fact that the external body (1), the internal body (2) and the intermediate body (3) are configured on the basis of a prismatic geometry.

3. The desalination device using selective membranes and magnetic fields, according to claim 2, characterised by the fact that it has an external magnet (1) coiled on its external surface and an internal magnet (2) of one or more pairs of coils made of superconductor material.

4. A desalination device using selective membranes and magnetic fields, comprising an external tubular magnet (1), an internal tubular magnet (2) coaxially housed within said external tubular magnet and an intermediate body housed between said external and internal tubular magnets (3) with ion-selective membranes (6 and 7) characterised by the fact that the external magnet (1), the internal magnet (2) and the intermediate body (3) are mounted coaxially, where the intermediate body (3) has a hollow section with ion-selective membranes (6 and 7) positioned in an alternating, radial direction in such a way that each positive-ion-selective membrane (6) will have negative-ion-selective membranes (7) on both sides of it and each negative-ion-selective membrane (7) will have positive-ion-selective membranes on both sides (6).

* * * * *